United States Patent
Peng et al.

(10) Patent No.: US 7,623,184 B2
(45) Date of Patent: Nov. 24, 2009

(54) APPARATUS AND METHOD FOR DIGITAL IMAGE STABILIZATION

(75) Inventors: Yu-Chu Peng, Taichung (TW); Homer H. Chen, Thousand Oaks, CA (US); Chang-Jung Kao, Chungho (TW)

(73) Assignees: Quanta Computer Inc., Tao Yuan Shen (TW); National Taiwan University, Taipei (TW)

( * ) Notice: Subject to any disclaimer, the term of this patent is extended or adjusted under 35 U.S.C. 154(b) by 824 days.

(21) Appl. No.: 11/323,172

(22) Filed: Dec. 30, 2005

(65) Prior Publication Data

US 2006/0159178 A1 Jul. 20, 2006

(30) Foreign Application Priority Data

Jan. 3, 2005 (TW) ............... 94100108 A

(51) Int. Cl.
*H04N 7/01* (2006.01)
(52) U.S. Cl. .................................. 348/497
(58) Field of Classification Search ............. None
See application file for complete search history.

(56) References Cited

U.S. PATENT DOCUMENTS

| | | | | |
|---|---|---|---|---|
| 4,987,491 A * | 1/1991 | Kaite et al. | ........... | 348/497 |
| 5,280,345 A * | 1/1994 | Uehara et al. | ........... | 348/498 |
| 5,886,744 A * | 3/1999 | Hannah | ........... | 375/240.16 |
| 5,999,226 A * | 12/1999 | Choi | ........... | 348/564 |
| 6,256,003 B1 * | 7/2001 | Tsuchiya et al. | ........... | 345/87 |
| 6,556,249 B1 * | 4/2003 | Taylor et al. | ........... | 348/497 |
| 6,628,711 B1 | 9/2003 | Mathew et al. | | |
| 6,782,404 B2 * | 8/2004 | Choudhary | ........... | 708/300 |
| 7,123,307 B1 * | 10/2006 | Altmann | ........... | 348/497 |
| 7,262,723 B2 * | 8/2007 | Straussnig et al. | ........... | 341/120 |
| 7,496,728 B2 * | 2/2009 | Castlebary | ........... | 711/167 |

FOREIGN PATENT DOCUMENTS

JP 2002082154 A 3/2002

* cited by examiner

*Primary Examiner*—Paulos M Natnael
(74) *Attorney, Agent, or Firm*—Hoffman Warnick LLC

(57) ABSTRACT

The invention provides a digital image stabilization apparatus for compensating a jitter occurred in the ith frame among N frames of a video sequence, where each of the N frames includes a plurality of blocks, N is a natural number larger than or equal to 3 and i is an integer index ranging from 1 to N. The apparatus includes a determining module, a comparing module and an adjusting module. The determining module is to determine a block of background region BRi-1 in the (i−1)th frame. The comparing module, coupled to the determining module, is to compare the block of BRi-1 in the (i−1)th frame with the corresponding block in the ith frame so as to determine a jitter vector. The adjusting module, coupled to the comparing module, is to adjust the ith frame in accordance with the jitter vector to compensate for the jitter occurred in the ith frame.

8 Claims, 8 Drawing Sheets

APPARATUS AND METHOD FOR DIGITAL IMAGE STABILIZATION

BACKGROUND OF THE INVENTION

1. Field of the Invention

This present invention relates to a digital image stabilization apparatus for compensating a jitter occurred in one of the frames among a video sequence.

2. Description of the Prior Art

The current design for digital cameras and video camcorders gravitates towards light-weight and compact. When these light-weight and compact digital cameras or video camcorders are used, undesired shake or jitter, caused by environment or users, on these digital cameras and video camcorders are inevitable. Therefore, the undesired shake or jitter, subjected to the digital cameras or video camcorders, will result in blurred images or an abrupt change occurred in a frame among a video sequence. It is annoying for users to watch the jerky images or videos resulting from undesired shake or jitter. Therefore, it is an important topic to avoid shake or jitter on cameras or camcorders, or to adjust the blurred images so as to improve the image quality.

There is an approach been developed to adjust the blurred images captured by digital cameras and video camcorders. The prior art is, firstly, to divide all frames among a captured video sequence into a plurality of blocks. Next, the prior art is to compare all of the blocks of one of the frames with all of the blocks of the frame previous to the compared frame to respectively find out the blocks on such two frames that exhibit the same image, but locate different positions. The prior art is then to compute the relative distances (or so-called motion vectors) between the found-out blocks on such two frames. The computed relative distances (or motion vectors) are then used to adjust the last one of such two frames, and thereby remove the undesired shake or jitter occurred in the last one of such two frames.

However, there are two major problems existing in the aforementioned approach while considering hardware implementation. Firstly, since a digital image stabilizer disclosed in the prior art needs an extra buffer for storing all of the blocks of the previous frame before the comparison process is performed, the prior art increases the requirement of memory. Secondly, the comparison process of the prior art takes an exhaustive search strategy for the found-out blocks between such two frames to estimate the relative distances (motion vectors), which involves intensive computational operation and high power consumption. Unfortunately, the power management is also a critical issue on the design of digital cameras, video camcorders or other hand-held electronic apparatuses.

There is also another prior art relating to the image stabilization by use of an optical device, such as a gyro-sensor. The aforesaid prior art uses a gyro-sensor to detect shake (or jitter) subjected to a camera (or a video camcorder), and then shift a correction lens inside the lens system to eliminate the detected shake (or jitter). Obviously, the aforesaid prior art increases the overall cost due to additional gyro-sensor and more complicated design of lens system. Besides, the aforesaid prior art can not be applied in light-weight and compact electronic devices due to extra controlling circuit.

Accordingly, a major objective of the invention is to provide a digital image stabilization apparatus to overcome the aforementioned problems.

SUMMARY OF THE INVENTION

An objective of the invention is to provide a digital image stabilization apparatus for compensating a jitter occurred in one of the frames of a video sequence to obtain stable images and comforts for viewers.

The digital image stabilization apparatus according to the invention is used to compensate a jitter occurred in the ith frame among N frames of a video sequence, where each of the N frames includes a plurality of blocks, N is a natural number larger than or equal to 3, and i is an integer index ranging from 1 to N. The digital image stabilization apparatus includes a determining module, a comparing module and an adjusting module. The determining module is to determine a block of a background region $BRi-1$ in the (i−1)th frame. The comparing module, coupled to the determining module, is to compare the block of $BRi-1$ in the (i−1)th frame with the corresponding block in the ith frame so as to determine a jitter vector. The adjusting module, coupled to the comparing module, is to adjust the ith frame in accordance with the jitter vector to compensate for the jitter occurred in the ith frame.

The digital image stabilization method according to the invention firstly determines the block of $BRi-1$ in the (i−1)th frame by the determining module, and compares the block of $BRi-1$ in the (i−1)th frame with the corresponding block in the ith frame so as to determine a jitter vector by the comparing module. The adjusting module is then applied to adjust the ith frame according to the jitter vector to compensate for the jitter occurred in the ith frame. The digital image stabilization method according to the invention avoids storing the whole frame in memory by confining the comparing area to the block of background region. Therefore, the digital image stabilization method according to the invention takes less memory to accomplish jitter compensation, and can reduce the computation time significantly.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
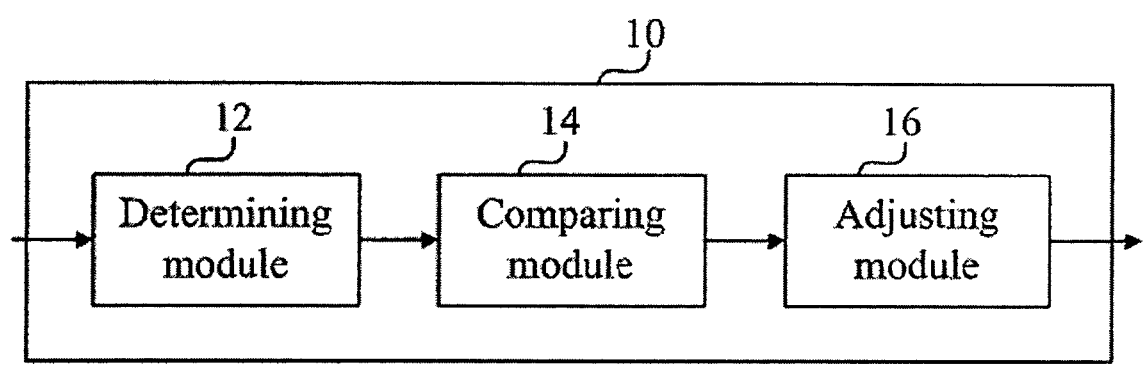
FIG. 1 is the function block diagram of the digital image stabilization apparatus according to the invention.

Referring to FIG. 1, the function block diagram of the digital image stabilization apparatus 10 is illustrated. As shown in FIG. 1, the invention relates to a digital image stabilization apparatus 10 for compensating a jitter occurred in the ith frame among N frames of a video sequence, where the video sequence relates to a scene, each of the N frames includes a plurality of blocks, N is a natural number larger than 3, and i is an integer index ranging from 1 to N. The digital image stabilization apparatus 10 includes a determining module 12, a comparing module 14 and an adjusting module 16.

The determining module 12 is to determine a block of a background region BRi-1 in the (i−1)th frame. The comparing module 14, coupled to the determining module 12, is to compare the block of BRi-1 in the (i−1)th frame with the corresponding block in the ith frame so as to determine a jitter vector. The adjusting module 16, coupled to the comparing module 14, is to adjust the ith frame in accordance with the jitter vector to compensate for the jitter occurred in the ith frame.

Figure 2:
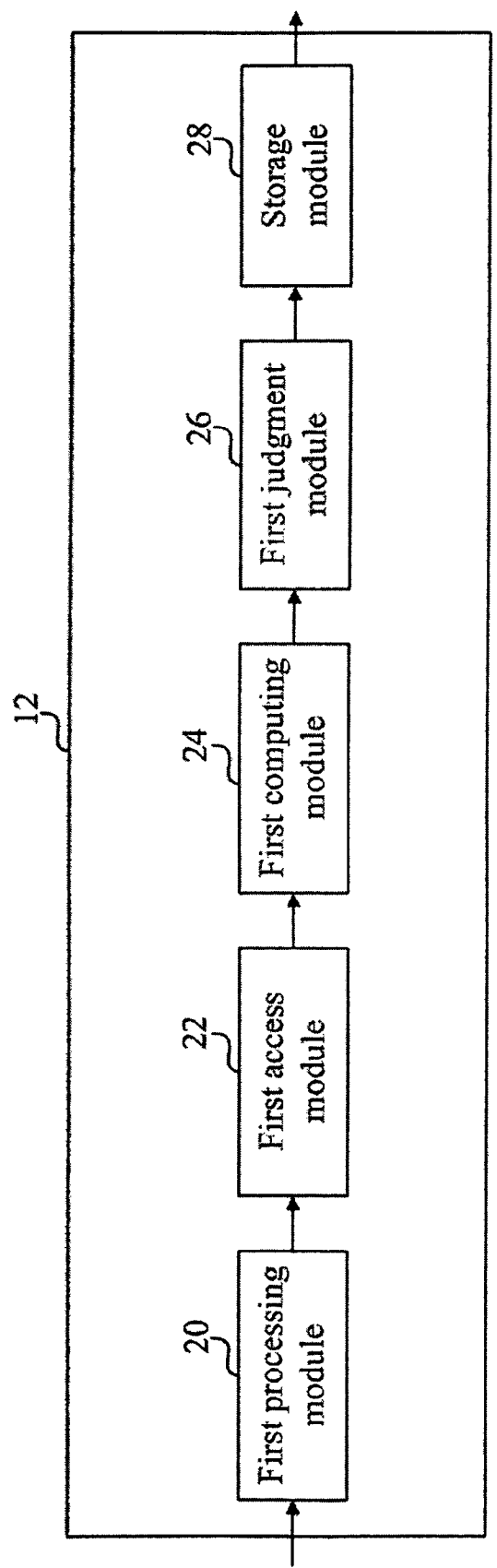
FIG. 2 is the function block diagram of the determining module of the digital image stabilization apparatus according to an embodiment of the invention.

Referring to FIG. 2, the function block diagram of the determining module 12 of the digital image stabilization apparatus 10 according to an embodiment of the invention is illustrated. As shown in FIG. 2, the determining module 12 further includes a first processing module 20, a first access module 22, a first computing module 24, a first judgment module 26 and a storage module 28.

The first processing module 20 is to determine a block in the (j−2)th frame, which corresponds to a block in the (j−3)th frame, to define a global motion vector and set the block as a processing block in the (j−2)th frame, where j is an integer index ranging from 4 to (i−1).

The first access module 22, coupled to the first processing module 20, is to access the block in the (j−1)th frame which corresponds to the processing block in the (j−2)th frame determined by the first processing module 20 and identifies the block as a block of background region BRj-1 in the (j−1)th frame.

The first computing module 24, coupled to the first access module 22, is to calculate a jitter vector defined by the block of BRj-1 in the (j−1)th frame and the corresponding block in the jth frame.

The first judgment module 26, coupled to the first computing module 24, is to judge if the jitter vector computed by the first computing module 24 lies within a range and, if YES, adjust the jth frame in accordance with the jitter vector.

The storage module 28, coupled to the first judgment module 26, is to store the block of background region BRj-1.

In an embodiment showing how the determining module 12 determines a block of background region BRj-1, let the video sequence consist of four frames and thus j equals four. The first processing module 20 firstly determines a block in the second frame, which corresponds to a block in the first frame, to define a global motion vector and sets the block as a processing block in the second frame. The first access module 22 continues to access the block in the third frame that corresponds to the processing block in the second frame and identifies the block as a block of background region BR3 in the third frame.

Then, the first computing module 24 calculates a jitter vector defined by the block of BR3 in the third frame and the corresponding block in the fourth frame. The first judgment module 26 judges if the jitter vector lies within a range and, if YES, adjusts the fourth frame in accordance with the jitter vector.

The apparatus according to the invention further includes a video encoder, coupled to the first processing module 20, and a motion estimation module, embedded in the video encoder, for determining the global motion vector defined by the corresponding blocks in the (j−2)th frame and the (j−3)th frame.

In this embodiment, when the ith frame is being stabilized, the apparatus makes use of the (i−2)th frame and the (i−3)th frame to find two corresponding blocks that define a global motion vector and set the found block in the (i−2)th frame as a processing block. The block in the (i−1)th frame, which corresponds to the processing block in the (i−2)th frame, is retrieved and marked as the block of background region BRi-1 in the (i−1)th frame. The jitter vector is then computed by the block of BRi-1 and the corresponding block in the ith frame. Finally, the ith frame is adjusted in accordance with the jitter vector.

Figure 3:
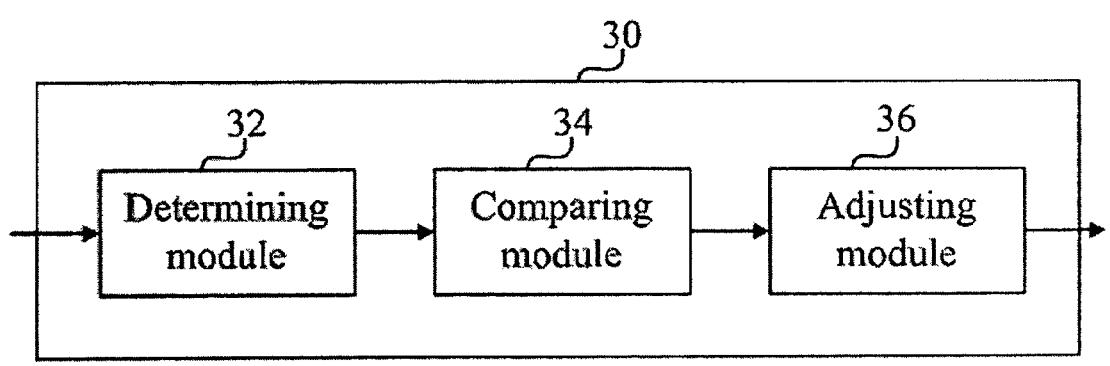
FIG. 3 is the block diagram of another digital image stabilization apparatus according to the invention.

Referring to FIG. 3, the function block diagram of another digital image stabilization apparatus 30 is illustrated. As shown in FIG. 3, the invention relates to a digital image stabilization apparatus 30 for compensating a jitter occurred in the ith frame among N frames of a video sequence, where the video sequence relates to a scene, each of the N frames includes a plurality of blocks, N is a natural number larger than 2, and i is an integer index ranging from 1 to N. The digital image stabilization apparatus 30 includes a determining module 32, a comparing module 34 and an adjusting module 36.

The determining module 32 is to determine a block of a background region BRi-1 in the (i−1)th frame. The comparing module 34, coupled to the determining module 32, is to compare the block of BRi-1 in the (i−1)th frame with the corresponding block in the ith frame so as to determine a jitter vector. The adjusting module 36, coupled to the comparing module 34, is to adjust the ith frame in accordance with the jitter vector to compensate for the jitter occurred in the ith frame.

Figure 4:
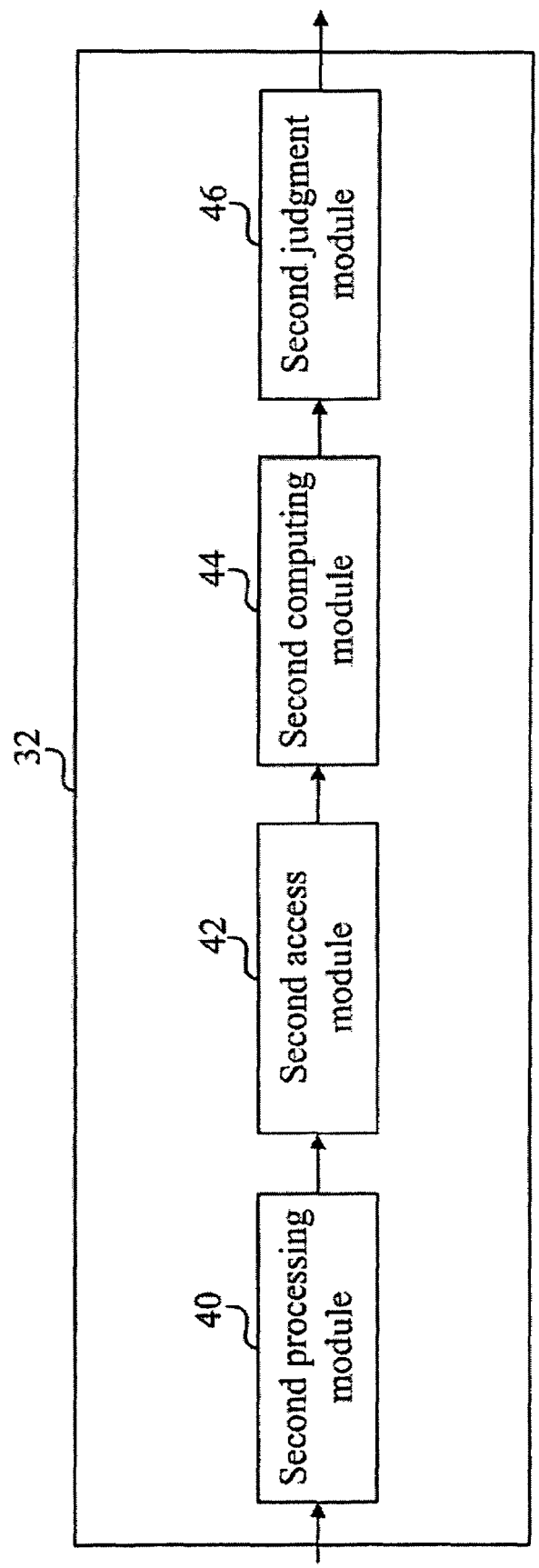
FIG. 4 is the function block diagram of the determining module of the digital image stabilization apparatus according to another embodiment of the invention.

Referring to FIG. 4, the function block diagram of the determining module 32 of the digital image stabilization apparatus 30 according to another embodiment of the invention is illustrated. As shown in FIG. 4, the determining module 32 further includes a second processing module 40, a second access module 42, a second computing module 44 and a second judgment module 46.

The second processing module 40 is to determine a block in the (j−1)th frame, which corresponds to a block in the (j−2)th frame, to define a global motion vector and set the block as a processing block in the (j−1)th frame, where j is an integer index ranging from 3 to (i−1). The second access module 42, coupled to the second processing module 40, is to access the processing block in the (j−1)th frame and identifying the block as a block of background region BRj-1 in the (j−1)th frame.

The second computing module 44, coupled to the second access module 42, is to calculate a jitter vector defined by the block of BRj-1 in the (j−1)th frame and the corresponding block in the jth frame.

The second judgment module 46, coupled to the second computing module 44, is to judge if the jitter vector computed by the second computing module 44 lies within a range, and if YES, to adjust the jth frame in accordance with the jitter vector.

In this embodiment, the block of background region BRj-1 is determined directly from the processing block in the (j−1)th frame and the stabilization of the jth frame is conducted immediately. As a result, an additional storage module that saves the block of background region is not needed in this embodiment.

In an embodiment showing how the determining module 32 determines a block of background region BRj-1, let the video sequence consist of three frames and thus j equals three. The second processing module 40 firstly determines a block in the second frame, which corresponds to a block in the first frame, to define a global motion vector and sets the block as a processing block in the second frame. The second access module 42 continues to access the processing block in the second frame and identifying the block as a block of background region BR2 in the second frame.

Then, the second computing module 44 calculates a jitter vector defined by the block of BR2 in the second frame and the corresponding block in the third frame. The second judgment module 46 judges if the jitter vector lies within a range and, if YES, adjusts the third frame in accordance with the jitter vector.

In this embodiment, when the ith frame is being stabilized, the apparatus makes use of the (i−1)th frame and the (i−2)th frame to find two corresponding blocks that define a global motion vector and set the found block in the (i−1)th frame as a processing block. The processing block in the (i−1)th frame is retrieved and marked as the block of background region BRi-1 in the (i−1)th frame. The jitter vector is then computed by the block of BRi-1 and the corresponding block in the ith frame. Finally, the ith frame is adjusted in accordance with the jitter vector.

The apparatus according to the invention further includes a video encoder, coupled to the second processing module 40, and a motion estimation module is embedded in the video encoder to determine the global motion vector defined by the corresponding blocks in the (j−1)th frame and the (j−2)th frame.

Figure 5:
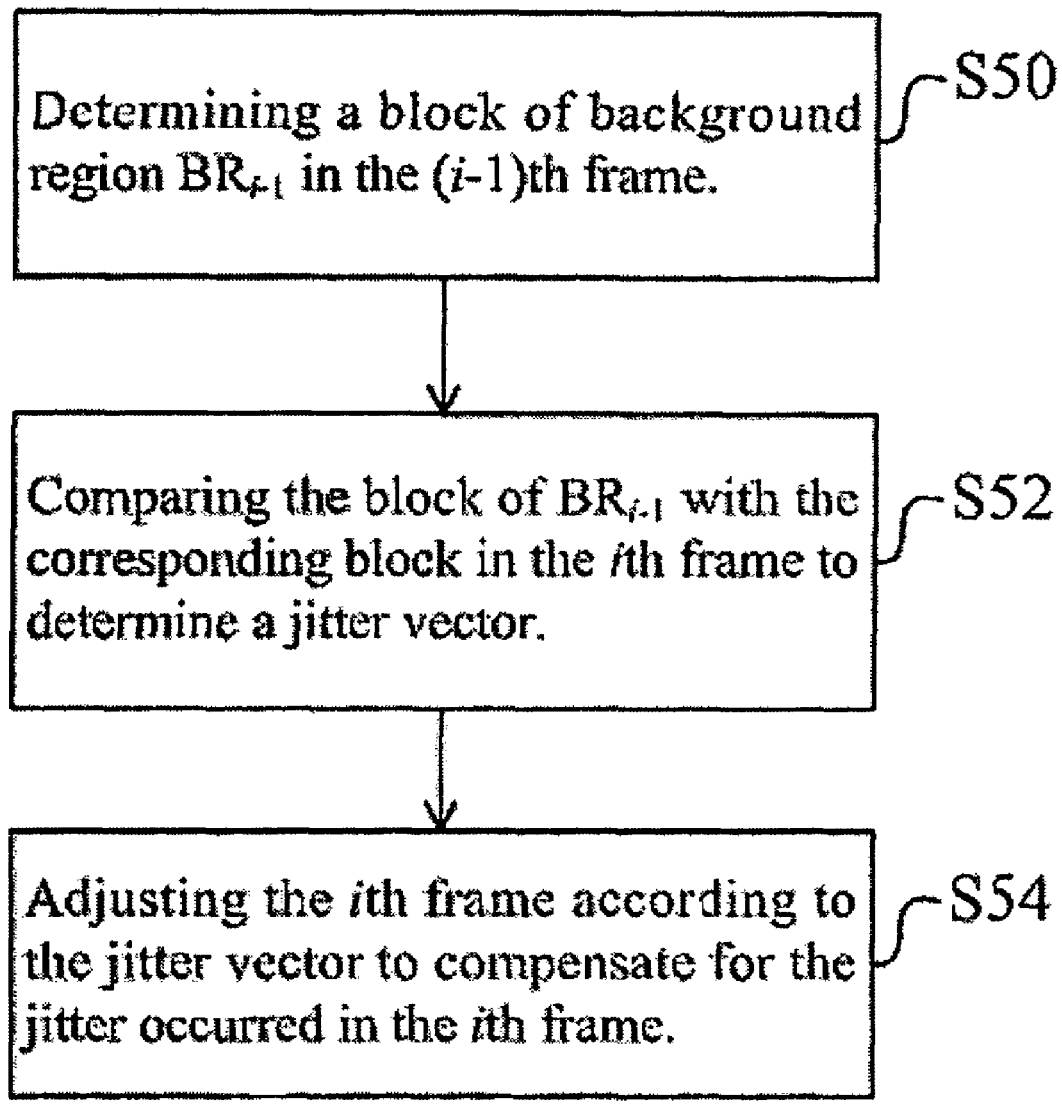
FIG. 5 is the flow chart of the digital image stabilization method according to the invention.

Referring to FIG. 5, the flow chart of the digital image stabilization method according to the invention is illustrated. As shown in FIG. 5, the invention provides a digital image stabilization method for compensating a jitter occurred in the ith frame among N frames of a video sequence, where the video sequence relates to a scene, each of the N frames includes a plurality of blocks, N is a natural number larger than 3, and i is an integer index ranging from 1 to N. The digital image stabilization method includes the steps of:

S50: Determining a block of background region BRi-1 in the (i−1)th frame.

S52: Comparing the block of BRi-1 in the (i−1)th frame in step S50 with the corresponding block in the ith frame to define a jitter vector.

S54: Adjusting the ith frame in accordance with the jitter vector to compensate for the jitter occurred in the ith frame.

Figure 6:
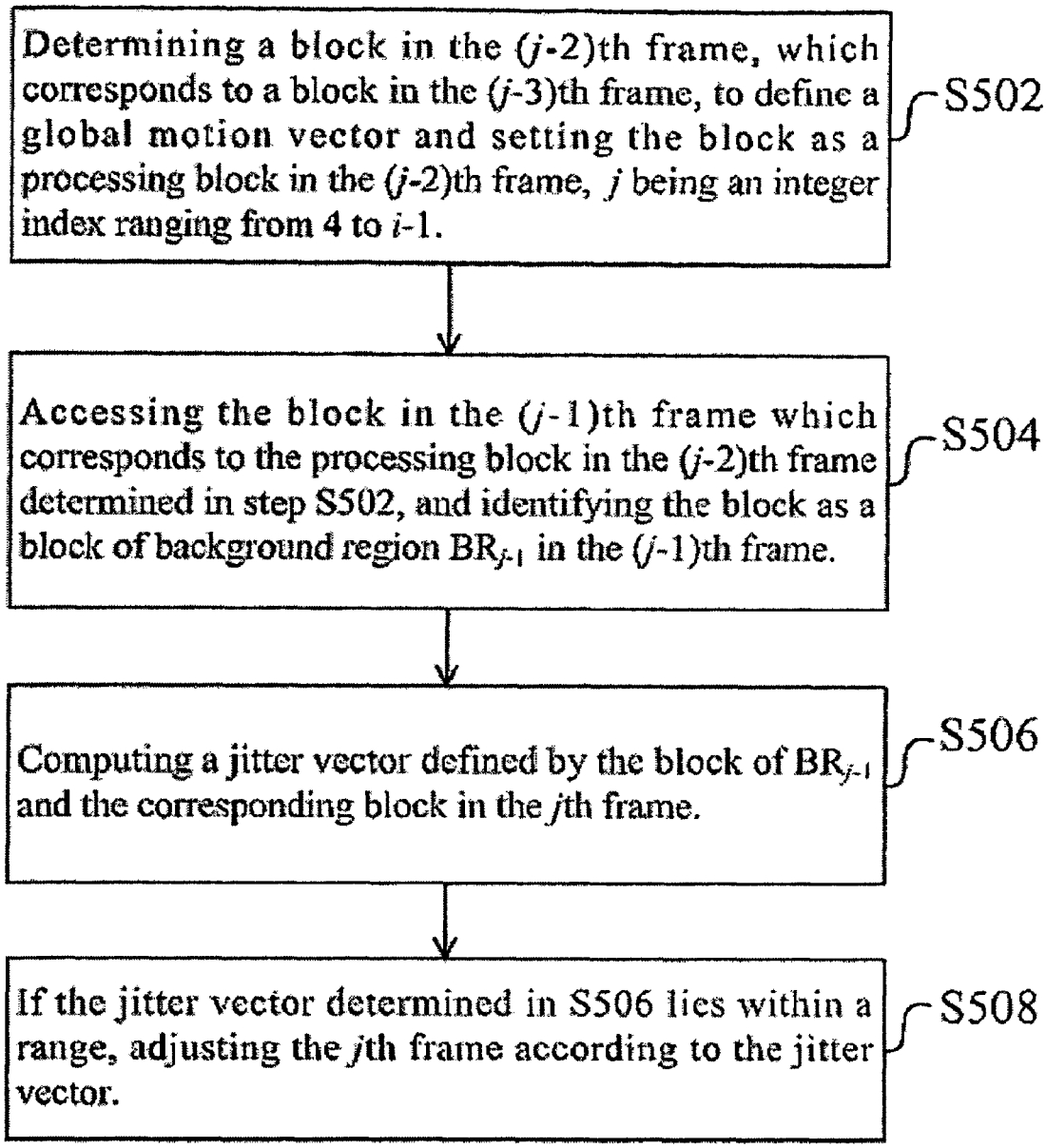
FIG. 6 is the flow chart of step S50 of the digital image stabilization method according to the invention, for determining a block of background region.

Please refer to FIG. 6, which is the flow chart of step S50 of the digital image stabilization method according to the invention demonstrating the steps of determining a block of background region. As shown in FIG. 6, step S50 further includes the steps of:

S502: Determining a block in the (j−2)th frame, which corresponds to a block in the (j−3)th frame, to define a global motion vector and setting the block as a processing block in the (j−2)th frame, j being an integer index ranging from 4 to (i−1). In an embodiment, this step is performed by a motion estimation module embedded in a video encoder.

S504: Accessing the block in the (j−1)th frame which corresponds to the processing block in the (j−2)th frame determined in step S502 and identifying the block as a block of background region BRj-1 in the (j−1)th frame.

S506: Computing a jitter vector defined by the block of BRj-1 in the (j−1)th frame and the corresponding block in the jth frame.

S508: If the jitter vector determined in step S506 lies within a range, adjusting the jth frame in accordance with the jitter vector.

Figure 7:
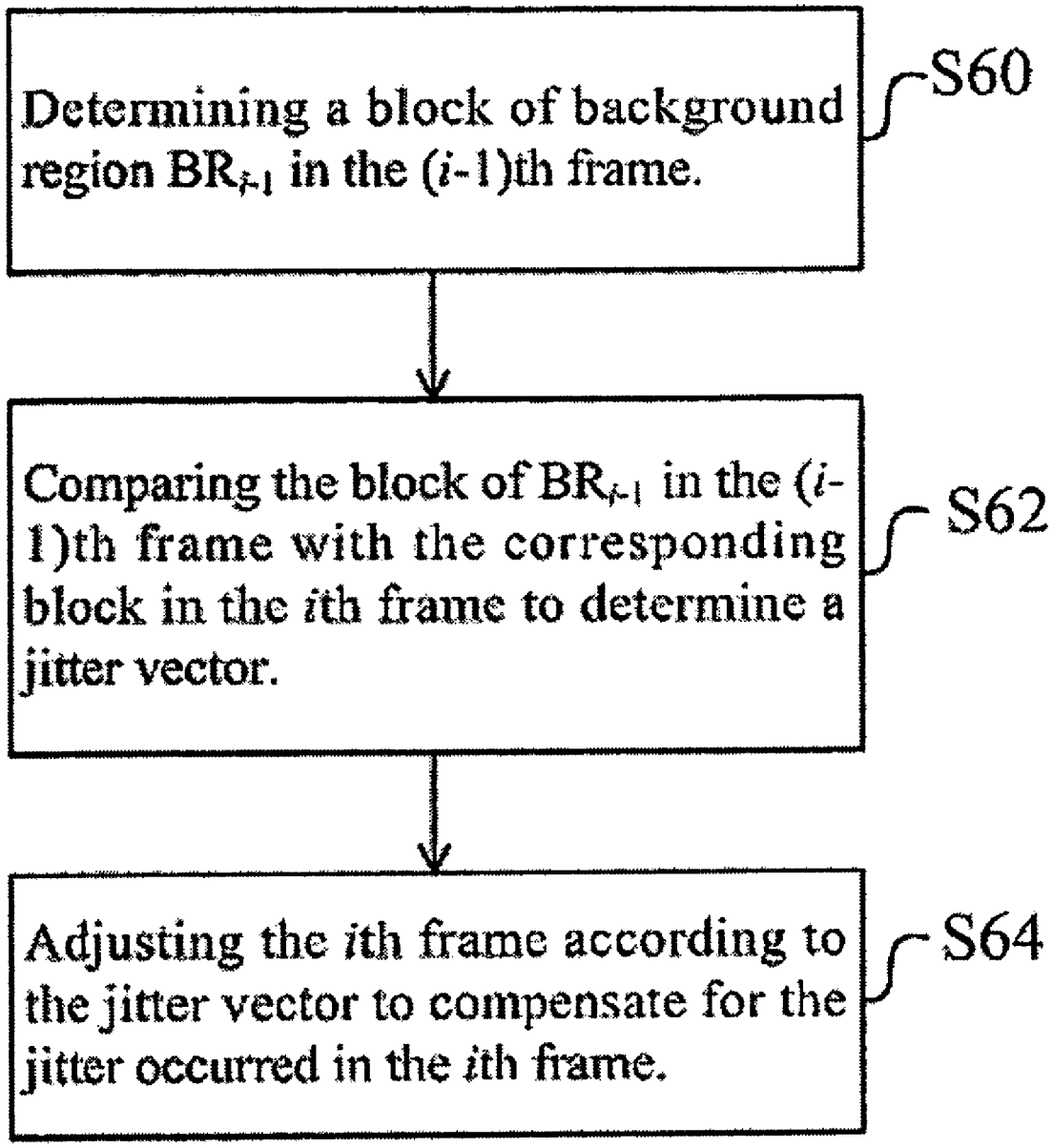
FIG. 7 is the flow chart of another digital image stabilization method according to the invention.

Referring to FIG. 7, the flow chart of another digital image stabilization method according to the invention is illustrated. As shown in FIG. 7, the invention provides a digital image stabilization method for compensating a jitter occurred in the ith frame among N frames of a video sequence, where the video sequence relates to a scene, each of the N frames includes a plurality of blocks, N is a natural number larger than 2, and i is an integer index ranging from 1 to N. The digital image stabilization method includes the steps of:

S60: Determining a block of background region BRi-1 in the (i−1)th frame.

S62: Comparing the block of BRi-1 in the (i−1)th frame in step S60 with the corresponding block in the ith frame to define a jitter vector.

S64: Adjusting the ith frame in accordance with the jitter vector to compensate for the jitter occurred in the ith frame.

Figure 8:
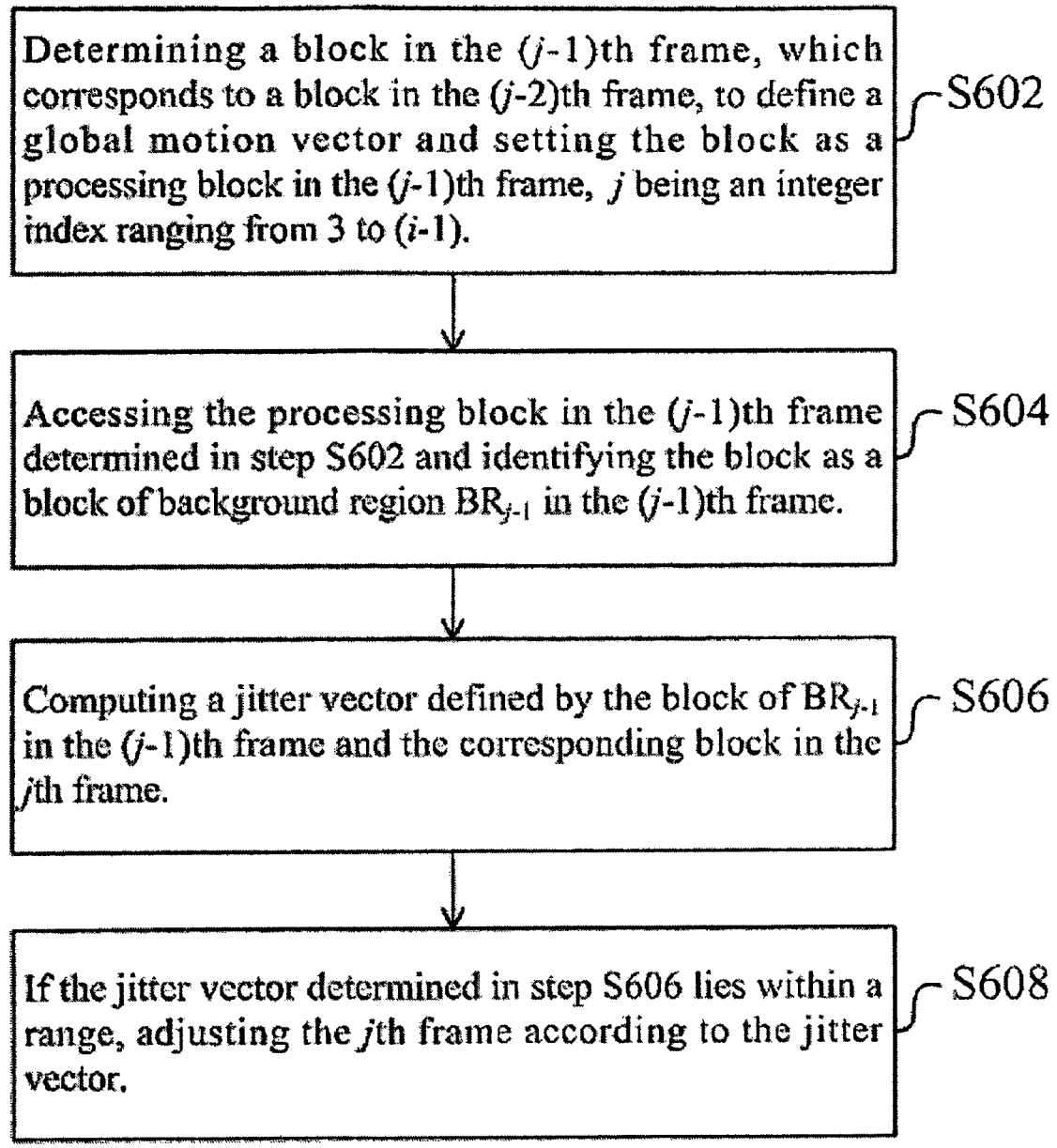
FIG. 8 is the flow chart of step S60 of the digital image stabilization method according to the invention, for determining a block of background region.

Please refer to FIG. 8, which is the flow chart of step S60 of the digital image stabilization method according to the invention demonstrating the steps of determining a block of background region. As shown in FIG. 8, step S60 further includes the steps of:

S602: Determining a block in the (j−1)th frame, which corresponds to a block in the (j−2)th frame, to define a global motion vector and setting the block as a processing block in the (j−2)th frame, j being an integer index ranging from 3 to (i−1).

S604: Accessing the processing block in the (j−1)th frame determined in step S602 and identifying the block as a block of background region BRj-1 in the (j−1)th frame.

S606: Computing a jitter vector defined by the block of BRj-1 in the (j−1)th frame and the corresponding block in the jth frame.

S608: If the jitter vector determined in step S606 lies within a range, adjusting the jth frame in accordance with the jitter vector.

The digital image stabilization apparatus according to the invention firstly determines the block of BRi-1 in the (i−1)th frame by the determining module and compares the block of BRi-1 in the (i−1)th frame with the corresponding block in the ith frame so as to determine a jitter vector by the comparing module. The adjusting module is then applied to adjust the ith frame in accordance with the jitter vector to compensate for the jitter occurred in the ith frame. The invention avoids storing the whole frame in memory by confining the comparing area to the block of background region. Therefore, it takes less memory to accomplish jitter compensation. The reduction of comparison also results in a speedup in computation and shortens the processing time for jitter compensation. In addition, digital cameras and video camcorders typically include a video encoder capable of frame comparison and global motion computation. These existing functionalities can be exploited to accomplish the selection of background region blocks without increasing the complexity of hardware design. To summarize, the invention provides a digital image stabilizer that has the advantages of fast, memory saving and low-cost. With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An apparatus for compensating a jitter occurred in the ith frame among N frames of a video sequence, each of the N frames comprising a plurality of blocks, N being a natural number larger than 3, and i being an integer index ranging from 1 to N, said apparatus comprising:
   a determining module for determining a block of background region $BR_{i-1}$ in the (i−1)th frame;
   a comparing module, coupled to the determining module, for comparing the block of $BR_{i-1}$ in the (i−1)th frame with the corresponding block in the ith frame to determine a jitter vector; and
   an adjusting module, coupled to the comparing module, for adjusting the ith frame in accordance with the jitter vector to compensate for the jitter occurred in the ith frame;
wherein the determining module comprises:
   a first processing module for determining a block in the (j−2)th frame, which corresponds to a block in the (j−3)th frame, to define a global motion vector and setting the block as a processing block in the (j−2)th frame, j being an integer index ranging from 4 to (i−1);
   a first access module, coupled to the first processing module, for accessing the block in the (j−1)th frame which corresponds to the processing block in the (j−2)th frame and identifying the block as a block of background region $BR_{j-1}$ in the (j−1)th frame;
   a first computing module for calculating a jitter vector defined by the block of $BR_{j-1}$ and the corresponding block in the jth frame;
   a first judgment module for judging if the jitter vector computed by the first computing module lies within a range and, if YES, adjusting the jth frame in accordance with the jitter vector; and
   a storage module, coupled to the first judgment module, for storing the block of $BR_{j-1}$.

2. The apparatus of claim 1, further comprising:
   a video encoder coupled to the first processing module; and
   a motion estimation module, embedded in the video encoder, for determining the global motion vector defined by the corresponding blocks in the (j−2)th frame and the (j−3)th frame.

3. An apparatus for compensating a jitter occurred in the ith frame among N frames of a video sequence, each of the N frames comprising a plurality of blocks, N being a natural number larger than 2, and i being an integer index ranging from 1 to N, said apparatus comprising:
   a determining module for determining a block of background region $BR_{i-1}$ in the (i−1)th frame;
   a comparing module, coupled to the determining module, for comparing the block of $BR_{i-1}$ in the (i−1)th frame with the corresponding block in the ith frame to determine a jitter vector; and
   an adjusting module, coupled to the comparing module, for adjusting the ith frame in accordance with the jitter vector to compensate for the jitter occurred in the ith frame;
wherein the determining module comprises:
   a second processing module for determining a block in the (j−1)th frame, which corresponds to a block in the (j−2)th frame, to define a global motion vector and setting the block as a processing block in the (j−1)th frame, j being an integer index ranging from 3 to (i−1);
   a second access module, coupled to the second processing module, for accessing the processing block in the (j−1)th frame determined by the second processing module and identifying the block as a block of background region $BR_{j-1}$ in the (j−1)th frame;
   a second computing module, coupled to the second access module, for calculating a jitter vector defined by the block of $BR_{j-1}$ and the corresponding block in the jth frame; and
   a second judgment module, coupled to the second computing module, for judging if the jitter vector computed by the second computing module lies within a range and, if YES, adjusting the jth frame in accordance with the jitter vector.

4. The apparatus of claim 3, further comprising:
   a video encoder coupled to the second processing module; and
   a motion estimation module, embedded in the video encoder, for determining the global motion vector defined by the corresponding blocks in the (j−1)th frame and the (j−2)th frame.

5. A method for compensating a jitter occurred in the ith frame among N frames of a video sequence, each of the N frames comprising a plurality of blocks, N being a natural number larger than 3, and i being an integer index ranging from 1 to N, said method comprising the steps of:
   (a) determining a block of background region $BR_{i-1}$ in the (i−1)th frame;
   (b) comparing the block of $BR_{i-1}$ determined in step (a) with the corresponding block in the ith frame to determine a jitter vector; and
   (c) adjusting the ith frame in accordance with the jitter vector to compensate for the jitter occurred in the ith frame;
wherein step (a) further comprises the steps of:
   (a1) determining a block in the (j−2)th frame, which corresponds to a block in the (j−3)th frame, to define a global motion vector and setting the block as a processing block in the (j−2)th frame, j being an integer index ranging from 4 to (i−1);
   (a2) accessing the block in the (j−1)th frame which corresponds to the processing block in the (j−2)th frame determined in step (a1) and identifying the block as a block of background region $BR_{j-1}$ in the (j−1)th frame;
   (a3) computing a jitter vector defined by the block of $BR_{j-1}$ and the corresponding block in the jth frame; and
   (a4) if the jitter vector determined in step (a3) lies within a range, adjusting the jth frame in accordance with the jitter vector.

6. The method of claim 5, wherein step (a1) is performed by a motion estimation module embedded in a video encoder.

7. A method for compensating a jitter occurred in the ith frame among N frames of a video sequence, each of the N frames comprising a plurality of blocks, N being a natural number larger than 2, and i being an integer index ranging from 1 to N, said method comprising the steps of:
   (a) determining a block of background region $BR_{i-1}$ in the (i−1)th frame;
   (b) comparing the block of $BR_{i-1}$ determined in step (a) with the corresponding block in the ith frame to determine a jitter vector; and
   (c) adjusting the ith frame in accordance with the jitter vector to compensate for the jitter occurred in the ith frame;
wherein step (a) further comprises the steps of:
   (a5) determining a block in the (j−1)th frame, which corresponds to a block in the (j−2)th frame, to define a global motion vector and setting the block as a processing block in the (j−1)th frame, j being an integer index ranging from 3 to (i−1);

(a6) accessing the processing block in the (j−1)th frame determined in step (a5) and identifying the block as a block of background region $BR_{j-1}$ in the (j−1)th frame;

(a7) computing a jitter vector defined by the block of $BR_{j-1}$ and the corresponding block in the jth frame; and (a8) if the jitter vector determined in step (a7) lies within a range, adjusting the jth frame in accordance with the jitter vector.

8. The method of claim 7, wherein step (a5) is performed by a motion estimation module embedded in a video encoder.

* * * * *